United States Patent [19]
Kageyama et al.

[11] 4,144,522
[45] Mar. 13, 1979

[54] ELECTRO-CONTROL SYSTEM FOR DATA TRANSMISSION

[75] Inventors: Satoshi Kageyama; Kunihiko Sekiya, both of Yokohama, Japan

[73] Assignee: Tokyo Shibaura Electric Co., Ltd., Tokyo, Japan

[21] Appl. No.: 771,445

[22] Filed: Feb. 24, 1977

[30] Foreign Application Priority Data

Feb. 25, 1976 [JP] Japan ................................. 51-18806

[51] Int. Cl.² .......................................... G08C 25/02
[52] U.S. Cl. ........................................ 340/146.1 BA
[58] Field of Search ............................ 340/146.1 BA

[56] References Cited

U.S. PATENT DOCUMENTS

| | | | |
|---|---|---|---|
| 2,805,278 | 9/1957 | Van Duuren | 340/146.1 BA |
| 3,456,239 | 7/1969 | Glasson | 340/146.1 BA |
| 3,475,723 | 10/1969 | Burton et al. | 340/146.1 BA |
| 3,676,846 | 7/1972 | Busch | 340/146.1 BA |
| 3,754,211 | 8/1973 | Rocher et al. | 340/146.1 BA |
| 3,956,589 | 5/1976 | Weathers et al. | 340/146.1 BA |
| 3,979,719 | 9/1976 | Tooley et al. | 340/146.1 BA |

*Primary Examiner*—Charles E. Atkinson
*Attorney, Agent, or Firm*—Oblon, Fisher, Spivak, McClelland & Maier

[57] ABSTRACT

An error-control system for a continuous ARQ system, wherein, when a transmitter detects a dummy signal different from a negative acknowledgment signal caused by a channel noise appearing on a transmission channel, the transmitter supplies a receiver with a block signal comprising a designating number of a given block, a block data thereof and a check code formed by reversing a prescribed error detection code, thereby controlling the occurrence of an error in data transmission between the transmitting and receiving sides.

5 Claims, 11 Drawing Figures

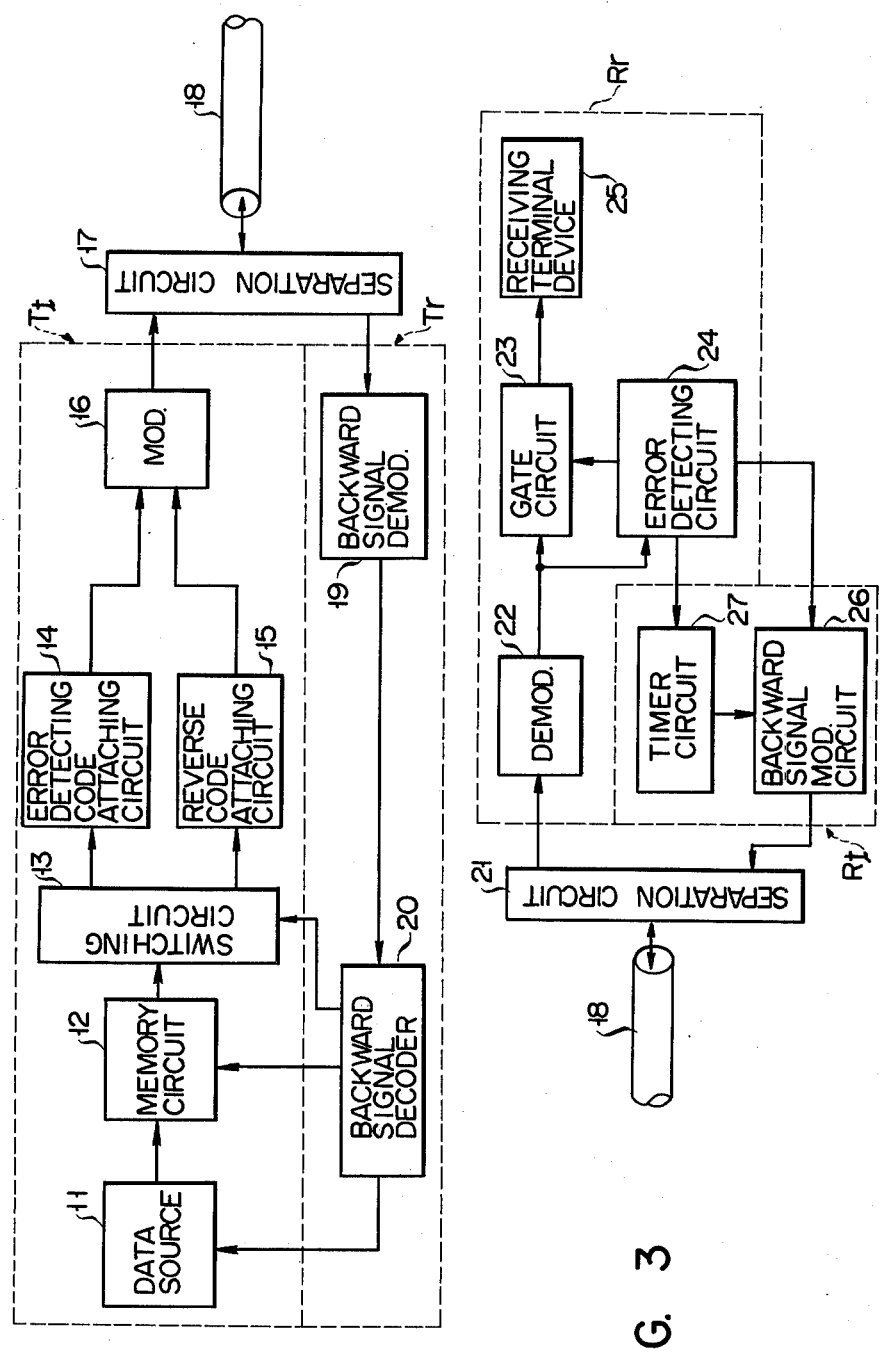

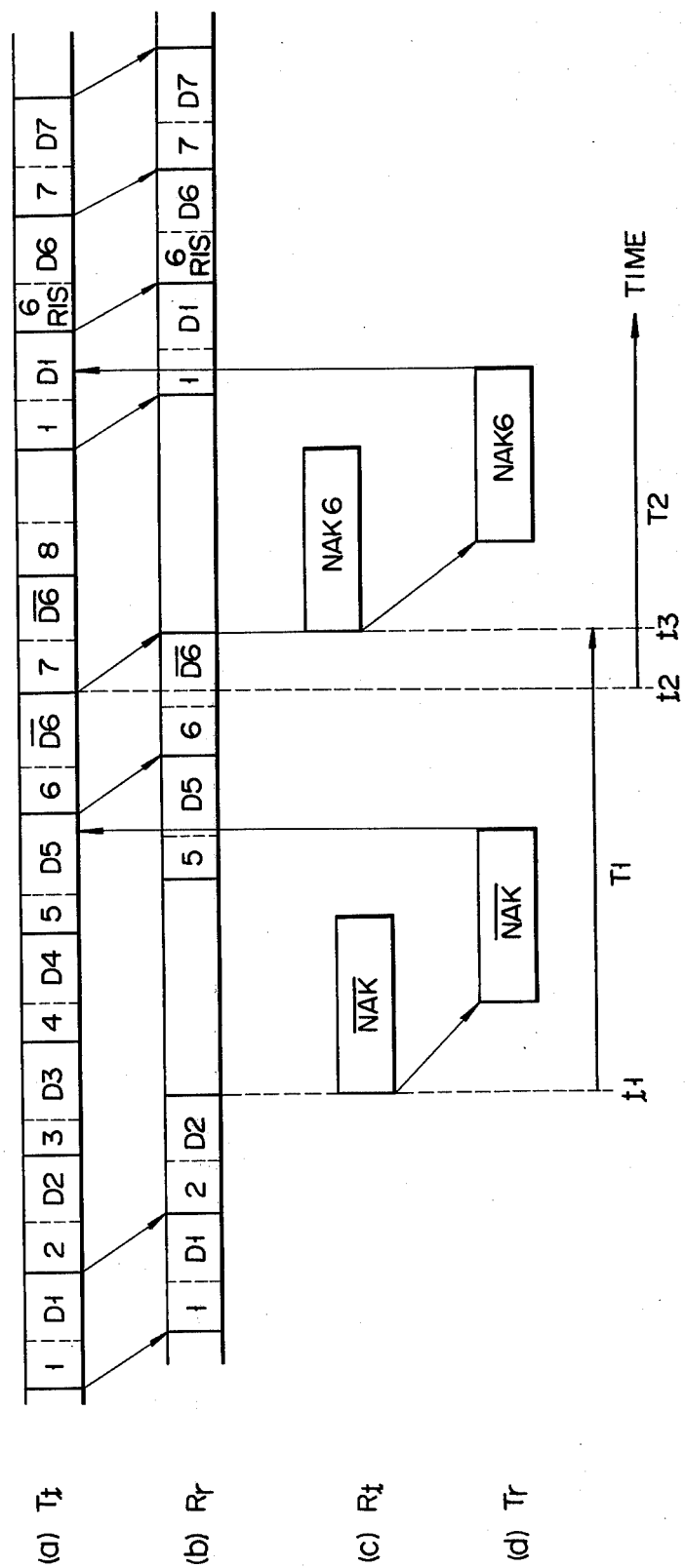
F I G. 9

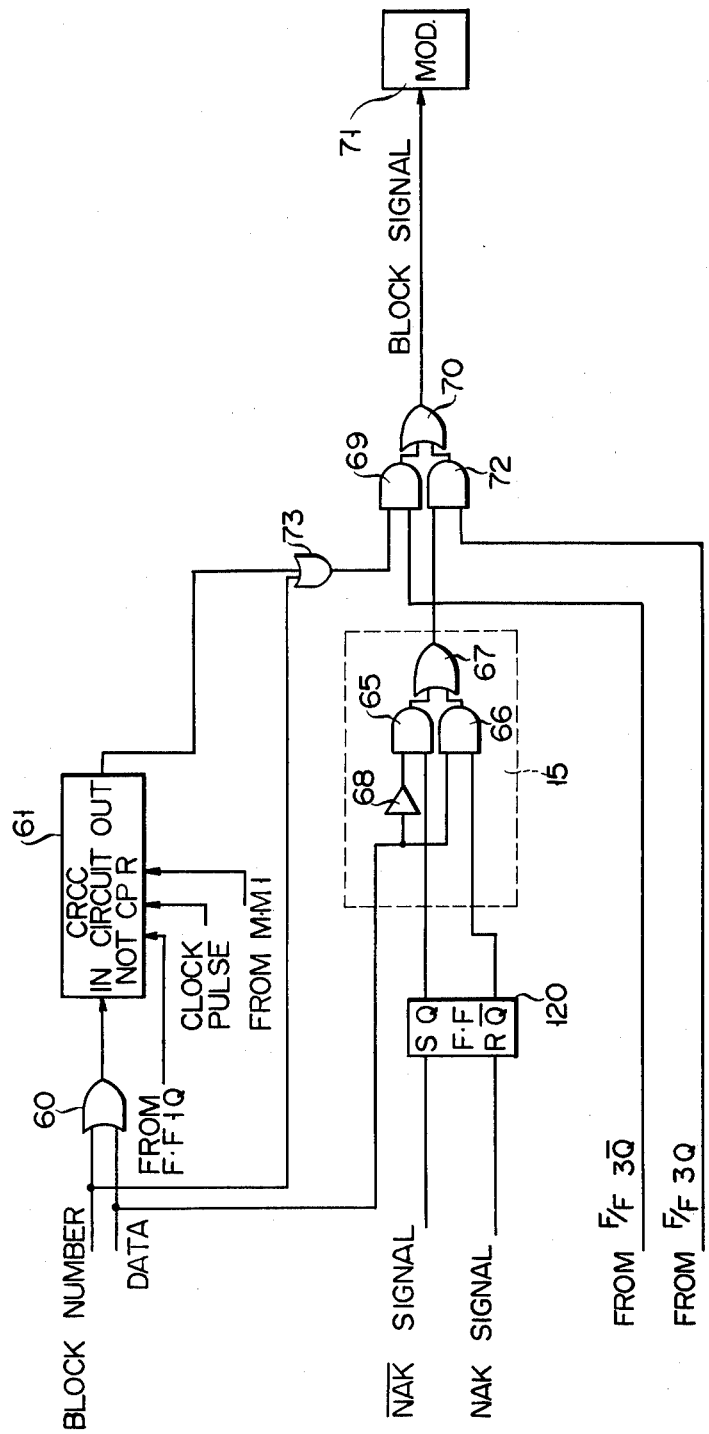

ELECTRO-CONTROL SYSTEM FOR DATA TRANSMISSION

BACKGROUND OF THE INVENTION

This invention relates to an error-control system for data transmission and more particularly to an automatic-repeat-request (abbreviated as ARQ) system for controlling the occurrence of errors in a transmission channel when a data block is transmitted.

Error control used with a data transmission system is already known. Errors and error control are set forth in a publication entitled "Errors and Error Control," by H. O. Burton and D. D. Sullivan, Proceedings of the LEEE, Vol. 60. No. 11, November 1972. The automatic-repeat-request (ARQ) system is detailed in a publication entitled "ARQ Error Control on the Satellite Channel," by Allen G. Gatfield, et al, COMSAT Laboratories (International Conference on Communications 1974).

A generally accepted type of the ARQ system divides a series of data into blocks each having a prescribed number of bits, attaches, if necessary, a check code for detection or correction of errors after each data block and transmits the data block and check code in the form of a block signal. With one type of the ARQ system, that is, a continuous ARQ system, a series of data blocks are continuously sent forth from the transmitting side to the receiving side through a transmission channel. When notified of a data transmission error by the receiving side, the transmitting side again delivers to the receiving side a series of data blocks formed of an original data block corresponding to an erroneous data block and other succeeding properly transmitted data blocks. This continuous ARQ system is favorably accepted as economical and efficient.

FIG. 1 illustrates a sequence in which data are transmitted and received in the typical continuous ARQ system. With this system, the receiving side does not make any response (no response) to the transmitting side when supplied with error-free data and issues a negative acknowledgment (NAK) signal only when receiving erroneous data. The transmitting section of the transmitting side supplies the receiving side through a forward channel with a data block formed of a prescribed number of bits and error-detecting bits attached thereto as shown in FIG. 1(a). Now, let it be assumed that a data block 2 is rendered erroneous by a noise occurring in a transmission channel. Then, the receiving section of the receiving side detects the erroneous data block 2 as shown in FIG. 1(b). At this time, the transmitting section of the receiving side supplies the transmitting side through a backward channel with an NAK2 signal as shown in FIG. 1(c) denoting that the data block 2 has not been received in a proper state. The NAK2 signal received by the receiving section of the transmitting side is conducted to the transmitting section of the transmitting side as shown in FIG. 1(d). When supplied with the NAK2 signal, the transmitting section of the transmitting side stops transmission of data blocks as shown in FIG. 1(a), and again delivers to the receiving side a series of data blocks, starting with an original data block corresponding to the erroneous data block 2 with a retransmission signal RIS attached. The receiving side temporarily stops operation, until the data block 2 is received in a corrected form, and discards data blocks previously following the erroneous data block 2.

In the case where the transmitting side receives a signal which is not an NAK signal, the following two processes are customarily applied:

(A) The transmitting side does not make enquiry to the receiving side. Accordingly, the receiving side generally retransmits a second NAK signal, unless the transmitting side supplies the receiving side with a correct group of data blocks in a prescribed length of time after the first NAK signal was sent forth to the transmitting side.

(B) HDLC–High Level Data Link Control System

When supplied with a different signal from the NAK signal, the transmitting side sends forth an enquiring (ENQ) signal to the receiving side.

The above-mentioned steps prevent the stoppage of data transmission between the transmitting and receiving sides, even when the NAK signal issued from the receiving side to the transmitting side is rendered erroneous due to the occurrence of a channel noise on the transmission channel and the NAK is not detected by the transmitting side in a proper form.

However, it sometimes happens that a dummy NAK signal arises by a channel noise appearing on a transmission channel, the said dummy NAK signal is detected by the transmitting side, though the receiving side has not issued any NAK signal. In such case, the receiving side does not under the above-mentioned process (A) deliver an NAK signal to the transmitting side, unless an erroneous data block is detected, but continuously receives data blocks. Upon receipt of a dummy NAK signal, the transmitting side stops transmission of data, until a proper NAK signal is received from the receiving side. This event results in the suppression of data transmission between the transmitting and receiving sides.

The above-mentioned process (B) indeed eliminates the stoppage of data transmission between the transmitting and receiving sides, but has the following disadvantages. In the case where the two-wire circuit is utilized in a full-duplex transmission channel, generally, the transmission side sends forth bit signals to the receiving side through a forward channel at a higher data rate than when the receiving side delivers bit signals to the transmitting side through a backward channel. Therefore, the ENQ signal issued from the transmitting side is very likely to be rendered erroneous. Accordingly, an extra time is required to correct the ENQ signal, so that it will consume a considerable length of time to restore data transmission to a normal state.

As mentioned above, the prior art error-controlling system sends forth a control signal in both forward and backward directions. Should these control signals be rendered erroneous during transit, much time is required to effect transmission of a proper control signal in an error-free state between the transmitting and receiving sides.

Moreover, particular codes concerning the ENQ signal and NOT signal have to be applied.

With the CCITT-V41 system, data should be carried through a transmission loop in a shorter time than when a single data block is transmitted from the transmitting side to the receiving side. With this CCITT-V41 system, the final bit for detecting an error state is reversed as errors sometimes occur due to the occurrence of noises on a transmission channel and it therefore should be ascertained whether an NAK signal is received by the transmitting side in an error-free state. This system does not clearly provide any countermeasure for reception of a dummy NAK signal $\overline{NAK}$.

SUMMARY OF THE INVENTION

It is accordingly an object of this invention to provide an error-controlling system of simple arrangement offering a high data-transmission efficiency.

Another object of the invention is to provide an error-controlling system which enables data transmission to be restored to a normal state very quickly even when a dummy negative acknowledgment signal arises due to the occurrence of a noise in a backward channel between the transmitting and receiving sides.

With the error-controlling system of this invention for transmission of data blocks, the transmitting side continuously supplies the receiving side through a forward channel with a series of block signals each formed of a block data, block number code and error-detecting code. The receiving side detects an error, if any, concerning each block signal, and, upon detection of an error, supplies the transmitting side through a backward channel with a negative acknowledgment (NAK) signal demanding the transmitting side again to deliver data blocks to the receiving side. Upon receipt of an NAK signal, the transmitting side again supplies the receiving side with a series of data blocks formed of an original data block corresponding to an erroneous data block and other succeeding data blocks. Upon receipt of a dummy NAK signal $\overline{NAK}$, the transmitting side supplies the receiving side with a block signal purposely made erroneous.

The advantages and features of this invention will be more clearly understood from the following description when taken with the appended drawings.

BRIEF DESCRIPTION OF THE DRAWINGS

FIG. 2 is a schematic block circuit diagram of a transmitting side of an error-controlling system according to an embodiment of this invention;

FIG. 3 is a schematic block circuit diagram of a receiving side of an error-controlling system according to this embodiment;

FIG. 9 is a time chart illustrating the operation of the error-control system of this invention;

FIG. 10 is a modification of the circuit of FIG. 2, fractionally showing a circuit for reversing a code of a block number; and FIG. 11 is another modification of the circuit of FIG. 2, fractionally showing a circuit for reversing the arrangement of a code denoting each block data.

DETAILED DESCRIPTION OF THE PREFERRED EMBODIMENT

Figure 1:
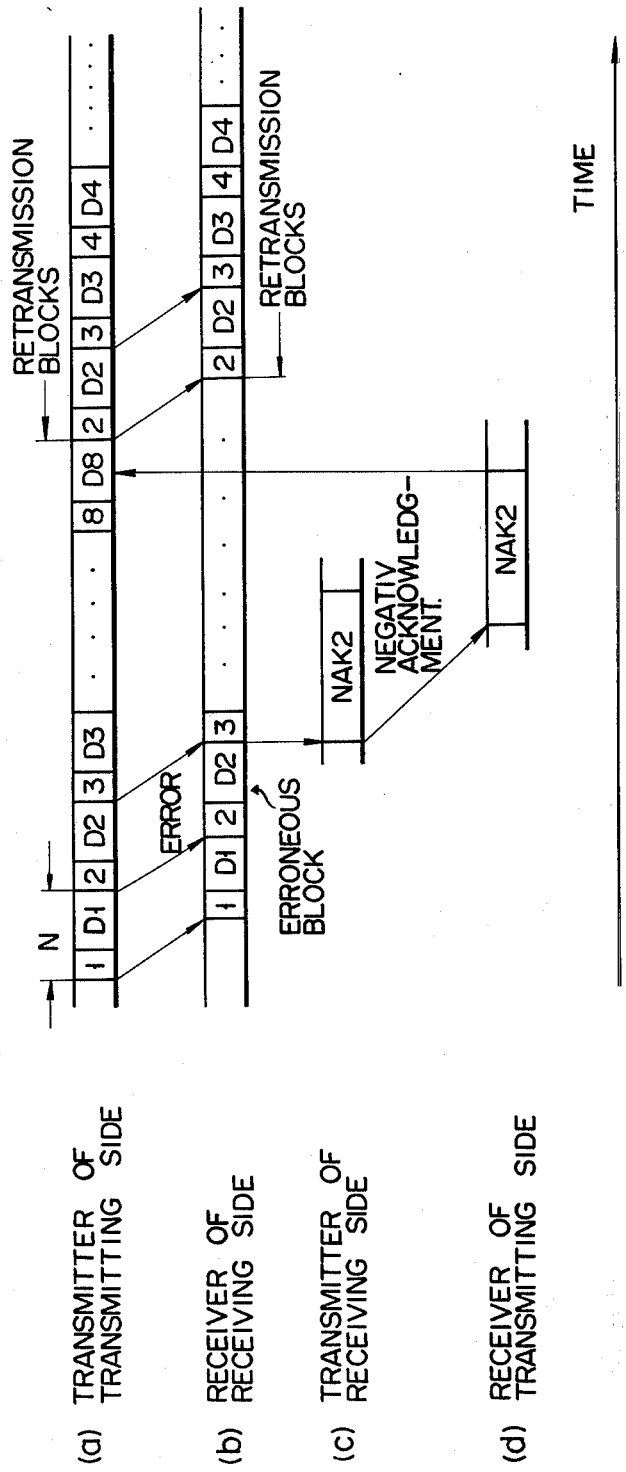
FIG. 1 is a time chart of a sequential data transmission between the transmitting and receiving sides according to the prior art continuous ARQ system.

The present inventors have discovered that a system in which a transmitting side supplies a receiving side with a prescribed signal purposely made erroneous, and in which the receiving side detects the erroneous block of the prescribed signal, can more easily attain correct data transmission than the prior art ARQ system in which, when supplied with a dummy NAK signal (represented by, for example, $\overline{NAK}$), the transmitting side issues an enquiry (ENQ) signal to the receiving side, and the receiving side detects an error, if any, concerning the ENQ signal to return to the normal data transmission after detecting the communication state.

The reason is that, when a two-wire circuit utilized in a full-duplex transmission channel is used, the ENQ signal which is transmitted through a forward channel at a high data rate is considerably liable to be rendered erroneous. The above-mentioned fact will be clearly understood from the following description. In this connection, it will be noted:

(1) Pc is a probability with which the transmitting side can send forth an ENQ signal having an n number of bits in an error-free state;

(2) Pd is a probability with which the transmitting side can supply the receiving side with a prescribed block signal formed of an M number of bits and purposely rendered erroneous by m bits ($1 \leq m \leq M$) in place of the ENQ signal; and (3) Pe is a bit error rate occurring in a transmission channel. In this case, this bit error rate Pe is assumed to arise at random in the transmission channel.

If any of the n bits constituting the ENQ signal is rendered erroneous, the ENQ signal becomes erroneous. Therefore, the probability Pc may be expressed as follows:

$$Pc = (1-Pe)^n \approx 1 - nPe \qquad (1)$$

If particular bits (for example, m bits as described above) of the prescribed block signal purposely rendered erroneous by the transmitting side are obstructed by a noise appearing in a transmission channel, then the prescribed block signal as a whole obviously becomes faulty. In such case, the probability Pd may be expressed as follows:

$$Pd = 1 - Pe^m \qquad (2)$$

In case of Pc>Pd, the following equation results from the above equations (1) and (2)

$$1 - n \cdot Pc > Pe^m \qquad (3)$$

The bit error rate may be taken to be $10^{-l}$. In this case, l is assumed to have the following value:

$$0 < P \qquad (4)$$

When $Pe = 10^{-l}$ is substituted in the above equation (3) with a necessary modification, then there results the following equation:

$$(m-1) \cdot l < -\log n \qquad (5)$$

The left side of the above equation (5) may be rewritten as follows from the conditions of $1 \leq m$ and the above equation (4)

$$0 < (m-1) \cdot l \qquad (6)$$

The following equation results from the above equations (5) and (6)

$$0 < -\log n \tag{7}$$

Since n denotes a larger number than 1, the above equation (7) can not be established. Thus Pd>Pc. Where, therefore, the transmitting side receives a dummy NAK signal (designated by, for example, $\overline{NAK}$), the probability Pd with which the transmitting side can deliver a prescribed purposely erroneous block signal to the receiving side is larger than the probability Pc with which the transmitting side can issue an ENQ signal to the receiving side in an error-free state. This means that the purposely erroneous block signal issued from the transmitting side never fails to be detected by the receiving side, no matter whether a noise appears in a transmission channel, thereby admitting of a reliable continuous transmission of data blocks.

The error-controlling system of this invention is characterized in that the above-mentioned fact is utilized in a data communication system.

FIGS. 2 and 3 jointly represent the embodiment in which the error-controlling system is applied to the continuous ARQ system. FIG. 2 shows the block circuit arrangement of the transmitting side of the error-controlling system of this invention. The transmitting side comprises a transmitting section $T_t$ which divides data into portions each having a prescribed number of bits and produces of a plurality of block signals each formed of a block number-designating code, block data code and error-detecting code and sends forth these block signals to the receiving side; and a receiving section $T_r$ which demodulates and decodes a backward signal delivered from a receiving side. In the transmitting section, data supplied from a data source 11 are stored in a memory circuit 12 in the block form having a prescribed number of (for example, 128) bits. A block number-designating code and a control code (for example, RIS code) formed of, for example, 8 bits is attached to each block data. The block data now provided with said block number-designating code is conducted through a switching circuit 13 to an error detecting code-attaching circuit 14 or a reverse code-attaching circuit 15 to be finally formed into a proper block signal having, for example, 152 bits. The error-detecting code is formed of, for example, 16 bits. After modulation, the block signal passes through a separation circuit 17 for selecting a forward or backward channel and is then transmitted to the receiving side through a former channel of a transmission channel 18. A backward signal for example, a negative acknowledgment (NAK) signal supplied from the receiving side through the backward channel of the transmission channel 18 is subjected to frequency division in the separation circuit 17. The backward signal is further conducted to a backward signal-demodulating circuit 19 included in a receiving section $T_r$ of the transmitting side to be demodulated and thereafter delivered to a backward signal decoder 20. The backward signal thus decoded controls the data source 11, memory circuit 12 and switching circuit 13.

FIG. 3 shows the block circuit arrangement of the receiving side of the error-controlling system of this invention. A forward block signal sent forth from the transmitting side through the transmission channel 18 is subjected to frequency division in a separation circuit 21 and supplied to a receiving section $R_r$ of the receiving side. After being demodulated in a demodulator 22, the block signal is conducted to a gate circuit 23 and error-detecting circuit 24. When the error-detecting circuit 24 does not detect any error concerning the block signal, the gate circuit 23 is opened to transmit the prescribed data to a receiving terminal device 25. Where an error is detected in the error-detecting circuit 24 concerning the forward block signal, the gate circuit 23 is controlled to prevent the forward block signal from being carried to the receiving terminal device 25. The error-detcting circuit 24 supplies a backward signal-modulating circuit 26 with the forward block signal, whose block number code has been determined to be erroneous. Upon receipt of an output from the error-detecting circuit 24, the backward signal-modulating circuit 26 generates a negative acknowledgment (NAK) signal having for example, 4-bits, and modulates a NAK signal formed of a 3-bit block number code whose error has been detected and a 1-bit parity code. An output from the modulating-circuit 26 is supplied to the transmitting side through the separation circuit 21 and backward channel of the transmission channel in turn. When the backward signal-modulating circuit 26 issues a modulated NAK signal, a timer circuit 27 is actuated by a detection output from the error-detecting circuit 24. The timer circuit 27 is set at a prescribed limit time required for the receiving side to receive, after issue of a NAK signal, a block signal including a 1-bit RIS code showing retransmission which was issued from the transmitting side. When the transmitting side does not retransmit a block signal to the receiving side, the timer circuit 27 again sends forth an output to the backward signal-modulating circuit 26. Upon receipt of an output from the timer circuit 27, the backward signal-modulating circuit 26 again generates a NAK signal concerning the same block signal. The NAK signal is subjected to frequency division in the separation circuit 21 and delivered to the receiving side through the backward channel of the transmission channel 18.

When the transmitting side does not retransmit a block signal, the receiving side supplies a NAK signal to the transmitting side at a prescribed time interval. The reason is that if the transmitting side can not detect a NAK signal which has been rendered erroneous due to the occurrence of a noise on a backward transmission channel, the transmission sequence between the transmitting and receiving sides is stopped.

Figure 4:
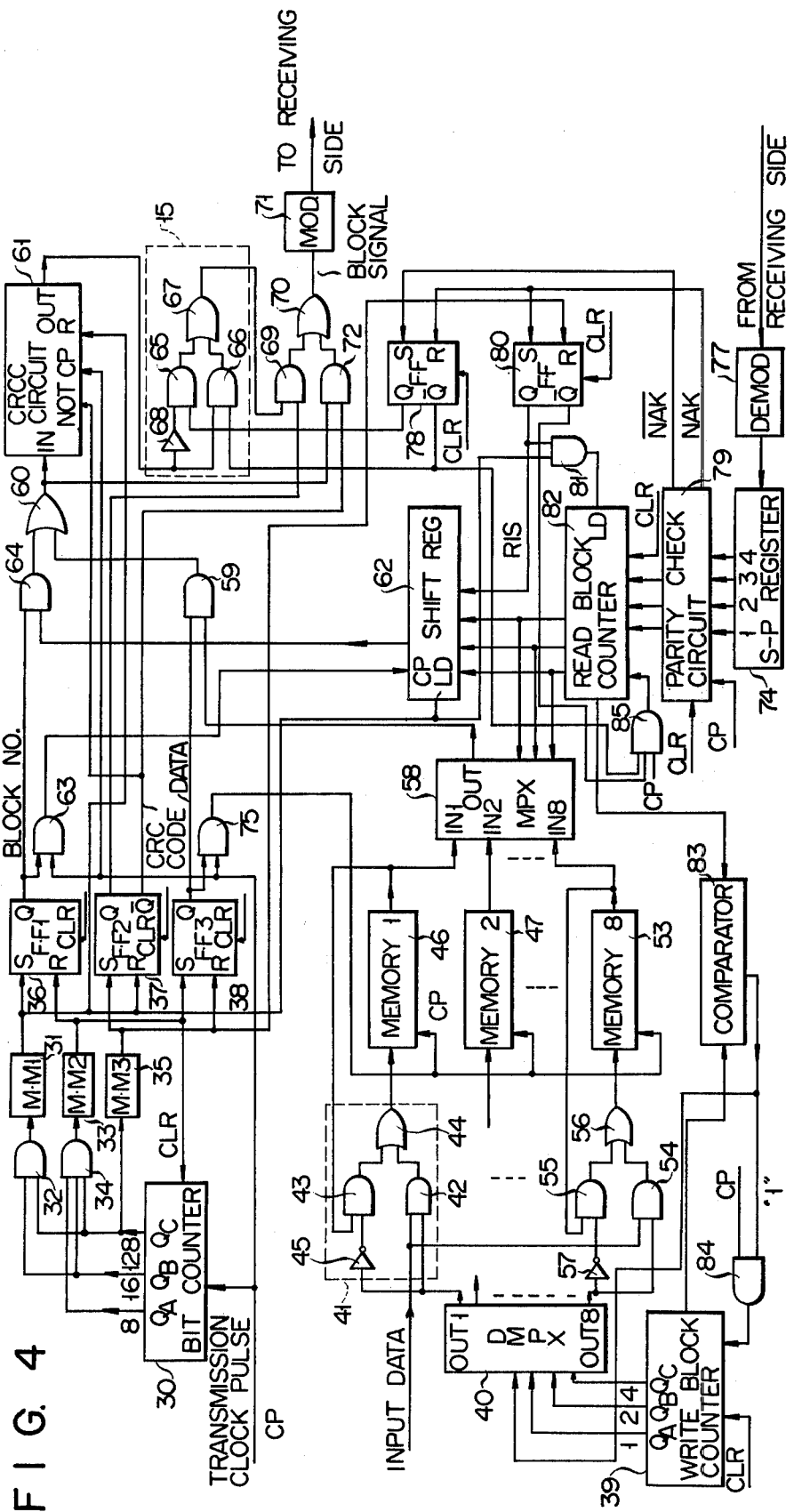
FIG. 4 presents a concrete form of the block circuit diagram of FIG. 2.
Figure 5:
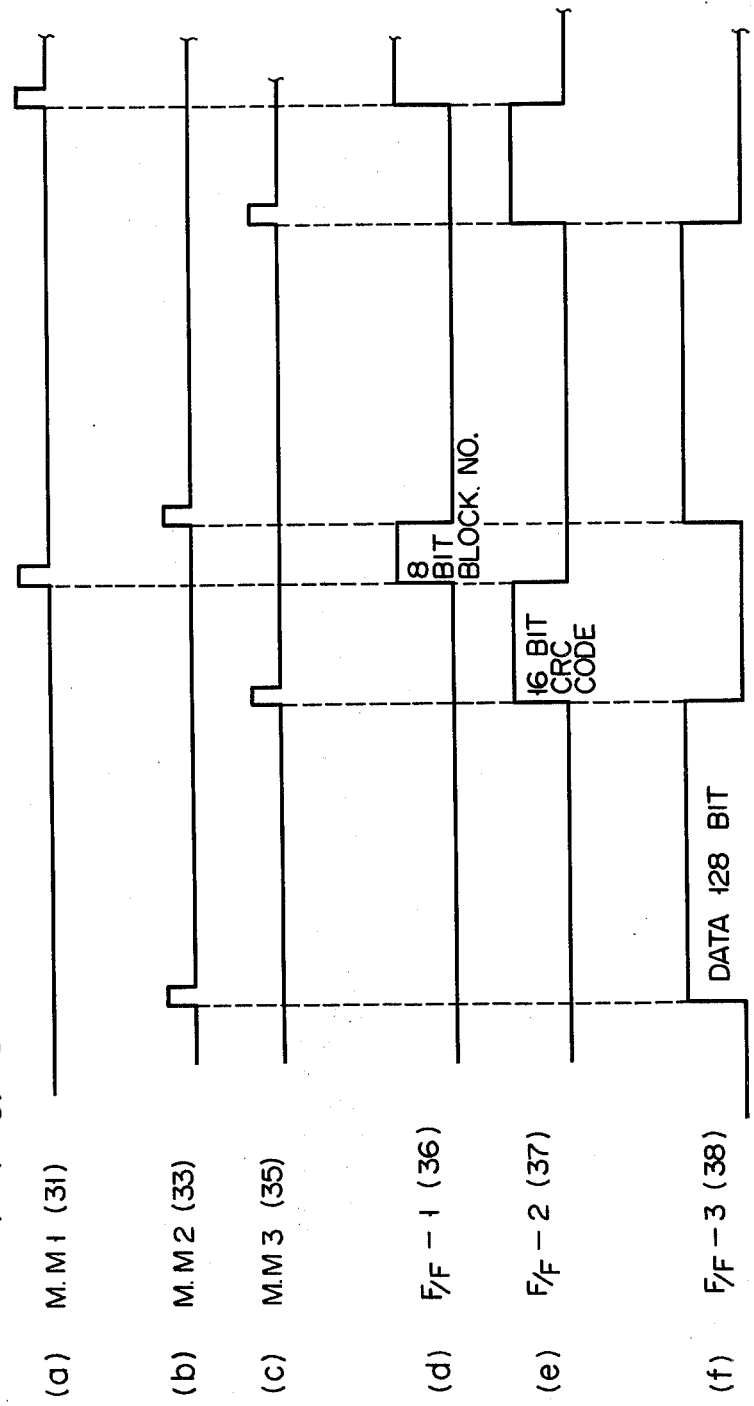
FIG. 5 is a simple time chart of the concrete block circuit diagram of FIG. 4.

FIG. 4 shows a concrete block circuit arrangement of the transmitting side of FIG. 2. FIG. 5 is a simple time chart illustrating the operation of the circuit arrangement of FIG. 4. Referring to FIG. 4, a bit counter 30 counts. When counting 8 clock pulses or 8 bits, the bit counter 30 produces an output $Q_A$ having a logic level of "1." When counting 16 clock pulses, the bit counter 30 generates an output $Q_B$ having a logic level of "1." When counting 128 clock pulses, the bit counter 30 sends forth an output $Q_C$ having a logic level of "1."

A monostable multivibrator (M·M1) 31 is rendered conducting by an output from an AND circuit 32 for a prescribed length of time as shown in FIG. 5(a). Similarly, a monostable multivibrator (M·M2)33 is rendered operative by an output from an AND circuit 34 for a prescribed length of time as shown in FIG. 5(b). A monostable multivibrator (M·M3) 35 is set by an output QC from the bit counter 30 for a prescribed length of time as shown in FIG. 5(c). These monostable multivibrators 31, 33, 35 provide bit timing. Namely, the monostable multivibrator 35 provides a timing in which to control the 16-bit error-detecting code; the monostable multivibrator 33 provides a timing in which to control a block data having 128 bits; and the monostable multivibrator 31 provides a timing in which to control the 8-bit block number code. These monostable multivibrators 31, 33, 35 set the flip-flop circuits 36, 37, 38. Namely, the flip-flop circuit 36 is set by the monostable multivibrator (M·M1) 31, as shown in FIG. 5(d) during the period in which a block number code is attached or sent forth to a block data. The flip-flop circuit 37 is set by the monostable multivibrator M·M3 (35), as shown in FIG. 5(e) during the period in which an error detection code is attached or sent forth to a block data. The flip-flop circuit 38 is set by the monostable multivibrator (M·M2) 33 as shown in FIG.5(f) during the period in which a block data is sent forth.

A write block counter 39 counts clock pulses and generates an output denoting a designating number of a data block being written. Namely, outputs $Q_A$, $Q_B$, $Q_C$ from the write block counter 39 indicate designating numbers (1 to 8) of data blocks. Outputs from the write block counter 39 are supplied to a demultiplex (DMPX) circuit 40, which in turn sends forth an output denoting a designating number of a data block selected from the 8 data blocks. An output, for example, OUT1 from the DMPX circuit 40 specifies a MEMORY 1-46 through a gate circuit 41. This gate circuit 41 comprises an AND circuit 42 supplied with an input data, an AND circuit 43 for recirculation of the input data, and an OR circuit 44 for producing a logical OR of the AND circuits 42, 43 and inverter 45. While the MEMORY 1-46 is specified for the designating block number of 1, input data are stored in the MEMORY 1-46 by clock pulses passing through AND circuits 75. A comparator 83 normally produces an output having a logic level of "1," but generates an output having a logic level of "0" only in a special case, as later described, to prevent clock pulses from being supplied to the MEMORY 1-46.

MEMORIES 2 to 8-47 to 53 and AND gates corresponding to the block numbers 2 to 8 are arranged and operated in the same manner as those corresponding to the block number 1. Accordingly, outputs from the MEMORIES 1 to 8-46 to 53 are supplied to a digital multiplexer 58.

Block data sent forth from the output terminal OUT of the digital multiplexer 58 are conducted to the error detecting code-attaching circuit 14 through an AND circuit 59 and OR circuit 60 during the flip-flop 38 set state.

The block numbers 1 to 8 of the MEMORIES 1 to 8-46 to 53 are loaded into a shift register 62 from a read counter 82 in a timing in which the monostable multivibrator (M·M1) 31 is set. While the flip-flop circuit 36 is set by a clock pulse passing through an AND circuit 63, the block numbers 1 to 8 are successively read out of the shift register 62 through an AN circuit 64 and OR circuit 60 to an error detecting code-attaching circuit 61 (hereinafter referred to as a "CRCC circuit"). This error detecting code-attaching circuit 61 attaches a 16-bit error-detecting code to a fractional block signal formed of a block data having 128 bits and a block number code having 8 bits. In this case, an ordinary cyclic code producing circuit, for example, of the MC8503P type (manufactured by the Motorola Semiconductors Company Limited) is applied. The NOT terminal is supplied to a $\bar{Q}$ output from the flip-flop circuit 37 providing a period required for an error-detecting code to be attached to the above-mentioned fractional block signal, thereby only actuating the circuit 61 as a shift register. CP shows a terminal supplied with a clock pulse. A signal supplied to a reset terminal R of the CRCC circuit 61 clears the block data stored in the circuit 61 at the rise of an output from the monostable multivibrator 31, thereby bringing the circuit 61 to an initial state ready for reception of block data. An output from the CRCC circuit 61 is conducted to a reversed code-attaching circuit 15 enclosed in broken lines.

The reversed code-attaching circuit 15 comprises an AND gate 65 which is opened upon receipt of a dummy NAK signal $\overline{NAK}$; an AND gate 66 which is opened upon receipt of an error-free NAK signal; an OR circuit 67 which ORs outputs from both AND circuits 65, 66; and an inverter 68 which reverses an output from the CRCC circuit 61.

An output from the reversed code-attaching circuit 15 is supplied to a modulator 71 through an AND circuit 69 which allows the passage of an error-detecting code and an OR circuit 70. Block data and their number codes are conducted to the modulator 71 through an AND gate 72. Accordingly, the output terminal of the OR circuit 70 sends forth a block signal formed of a block number code, block data and error-detecting code. An output block signal from the OR circuit 70 is modulated by the modulator 71 and delivered to the receiving side.

A backward signal (an NAK signal or a dummy NAK signal $\overline{NAK}$) supplied from the receiving side through a backward channel is demodulated by a demodulator 77 and conducted to a serial-parallel register 74. An NAK signal demanding the transmitting side to retransmit data to the receiving side is formed of 4 bits, namely a block number code of 3 bits and a parity code of 1 bit. The 3-bit block number code and 1-bit parity code stored in the serial-parallel register 74 is subjected to a parity check in a parity check circuit 79. When detecting a parity error, the parity check circuit 79 generates a parity error signal (that is a $\overline{NAK}$ code signal) which in turn sets a flip-flop circuit 78. When not detecting a parity error, the parity check circuit 79 generates a no parity error signal (that is a NAK code signal). The flip-flop circuit 78 is actuated when a reversed code is attached to a block data. When set, the flip-flop circuit 78 sends forth a set output to the reversed code-attaching circuit 15, thereby causing an error detecting code delivered from the error CRCC circuit 61 to be reversed.

A signal from the parity check circuit 79 which denotes coincidence between both NAK signals sets a flip-flop circuit 80. A set output from this flip-flop circuit 80 is used as a 1-bit retransmission signal RIS showing data again sent forth from the transmitting side. When an AND circuit 81 is supplied with the RIS signal, an output set pulse from the monostable multivibrator 31 is sent forth through the AND circuit 81. An output from the AND circuit 81 is carried to read block counter 82, thereby providing a timing signal for a block number code to be supplied from the parity check circuit 79 to the read block counter 82. When the flip-flop 77 is set by the $\overline{NAK}$ signal, the output from the AND counter 81 stops the read block counter 82 which normally carries out counting continuously to read block number codes out of the MEMORIES 46 to 53, in order to supply a block number code retransmitted from the parity check circuit 79 to the read block counter 82. Since a reset output $\bar{Q}$ from the flip-flop circuit 78 is conducted to an AND circuit 85, the above-mentioned stop operation is effected by preventing clock pulses from being supplied to the read block counter 82 while the flip-flop circuit 80 is set. Block number codes stored in the read block number counter 82 and a retransmission signal RIS from the flip-flop circuit 80 are carried to the shift register 62 in a timing in which a set signal is generated from the monostable multivibrator M·M1-31 (refer to FIG. 5(a)). The block number codes retransmitted from the read block number counter 82 are successively read out from the shift register 62 in succession upon receipt of clock pulses from the AND circuit 63, while the flip-flop circuit 1 (36) is set (See FIG. 5(d)), and then sent forth to the modulator through the AND circuit 64, OR circuit 60, AND circuit 72 and OR circuit 70 in turn.

While the flip-flop circuit 2 (37) is set as shown in FIG. 5(e), an error-detecting code issued from the CRCC circuit 61 is supplied to the modulator 71 through the AND circuit 66, OR circuit 67, AND circuit 69 and OR circuit 70.

Data is supplied to the multiplexer 58 from a memory corresponding to a block number specified for retransmission by the read block counter 82. This data is supplied to the modulator 71 through the AND circuit 59, OR circuit 60, AND circuit 72, and OR circuit 70 in turn, while the flip-flop circuit 3 (38) is set as shown in FIG. 5(f). Accordingly, a retransmitted block signal modulated by the modulator 71 is again sent forth to the receiving side through a forward channel.

When the transmitting side receives an NAK signal from the receiving side, data have to be prevented from being written in the MEMORIES 46 to 53. This stop operation is undertaken by the comparator 83. This comparator 83 normally compares an output from the read block counter 82 with an output from the write block counter 39 and produces an output of "1" level. In case of retransmission, however, the comparator 83 continues to generate an output of "0" level to stop the writing of data in the write block counter 39 and memories 46 to 53, until a block number supplied from the read block counter 82 is decreased by 1 from a block number issued from the write block counter 39, thereby preventing clock pulses from being issued from an AND circuit 84 to the write block counter 39. When the "0" level output of the comparator 83 is applied to the DMPX circuit 40, the outputs (OUT1–OUT8) of the DMPX circuit 40 become all zeroes. In consequence, no input data are written into the MEMORIES 1 to 8-46 to 53.

Figure 6:
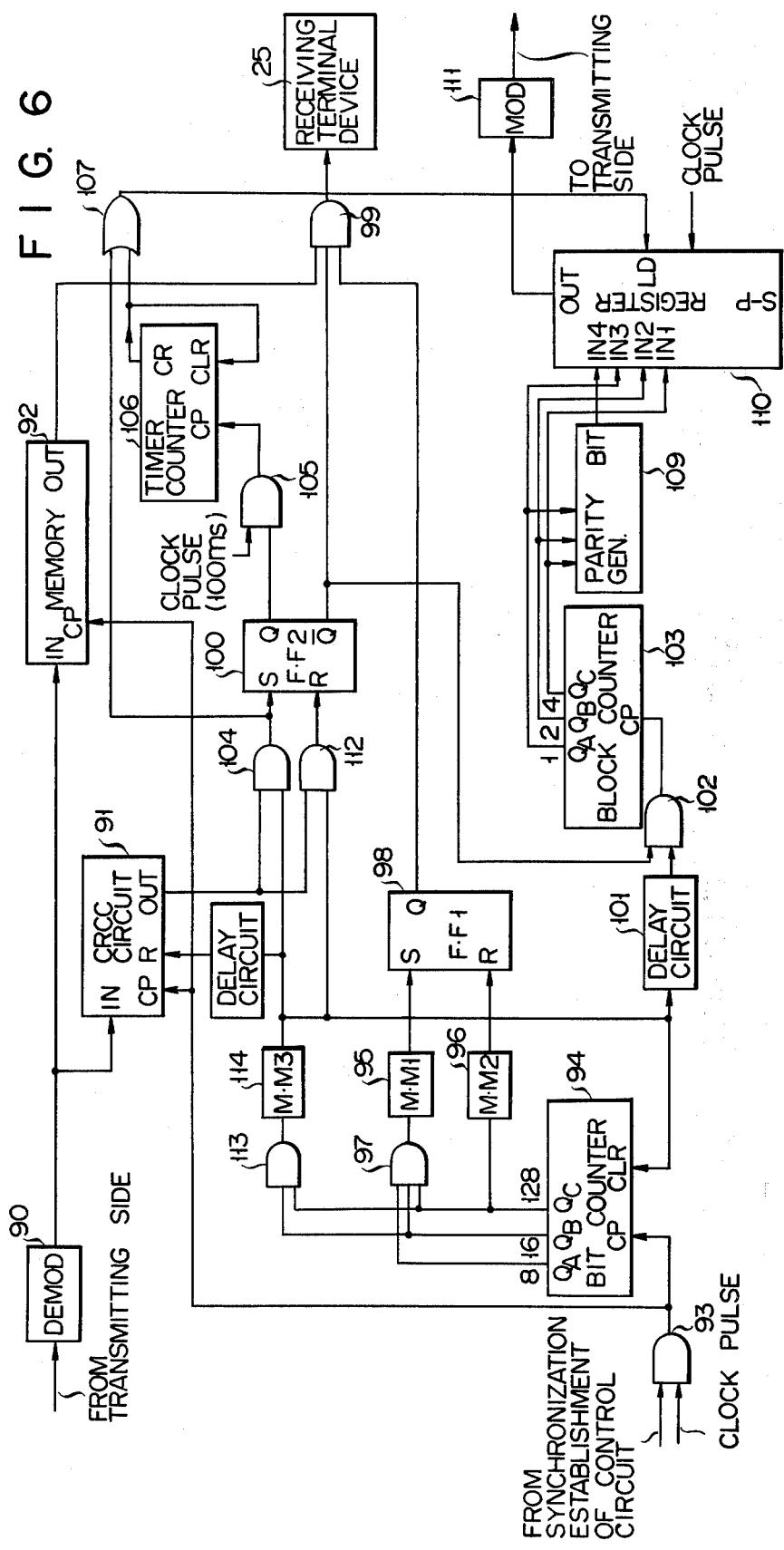
FIG. 6 shows a concrete form of the block circuit diagram of FIG. 3.
Figure 7:
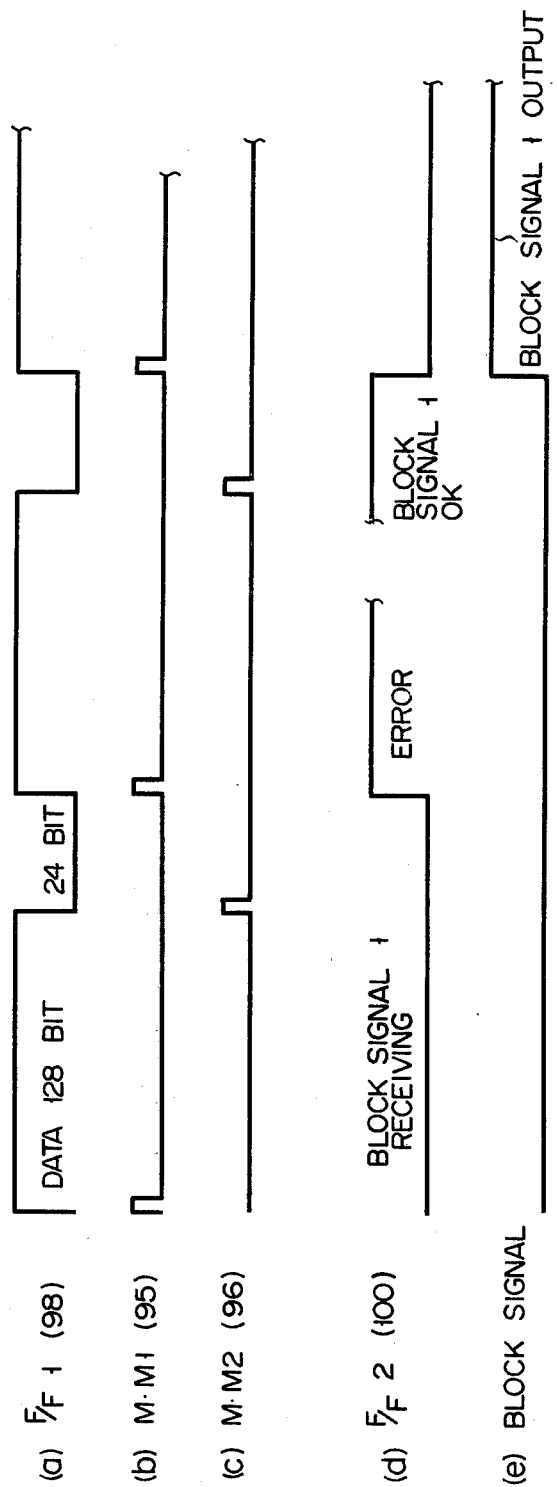
FIG. 7 is a simple time chart of the concrete block circuit diagram of FIG. 6.

FIG. 6 shows a concrete form of the block circuit diagram of the receiving side of the error-controlling system of this invention, and FIG. 7 is a time chart of FIG. 6. Referring to FIG. 6, a block signal supplied from the transmitting side is modulated by a modulator 90 and then conducted to an error-detecting circuit 91 and memory 92. These elements 91, 92 are operated in succession upon receipt of clock pulses controlled by an output from a synchronization-controlling flip-flop circuit (not shown) which is not needed when the synchronization is established by a synchronization control circuit. The clock pulses are counted by a bit counter 94 through an AND circuit 93. The bit counter 94 is operated in the same manner as the bit counter 30 of FIG. 4. When counting 8 bits, 16 bits and 128 bits, the bit counter 94 generates outputs $Q_A$, $Q_B$, $Q_C$ in succession. A monostable multivibrator 95 provides start timing to receive a block data included in a block signal delivered from the transmitting side. A monostable multivibrator 96 provides an end timing in which the receipt of the block data is to be brought to an end. An output from the bit counter 94 which has counted a prescribed number of bits actuates the monostable multivibrator 95 through an AND circuit 97 for a prescribed length of time as shown in FIG. 7(b). A set output from the monostable multivibrator 95 sets a flip-flop circuit 98 as shown in FIG. 7(a). A set output from the flip-flop circuit 98 is supplied to an AND circuit 99.

When the error-detecting circuit 91 does not detect an error concerning a block signal received, a flip-flop circuit 100 remains reset as shown in FIG. 7(d). Accordingly, a reset output $\bar{Q}$ of "1" level from the flip-flop circuit 100 is conducted to the AND circuit 99, causing data shown in the memory 92 to be supplied to the receiving terminal device 25 through the AND circuit 99. The receiving terminal device 25 indicates the prescribed data.

An output clock pulse from the monostable multivibrator 114 actuates a block counter 103 through a delay circuit 101 and an AND circuit 102. The block counter 103 is an 8-scale type which repeats counting, each time 8 block signals are supplied from the transmitting side, and indicates the numbers of the block signals received.

Where the error-detecting circuit 91 detects an error concerning a block signal, an error detection output is carried to an OR circuit 107 through an AND circuit 104 in a timing in which the monostable multivibrator 114 generates an output. An output from the OR circuit 107 is used as a timing signal for an NAK signal to be supplied to a parallel-serial register 110.

When the OR circuit 107 generates a clock pulse, the parallel-serial register 110 is supplied with the block number codes of block signals which are being delivered to the block counter 103 and a parity bit code sent forth from a parity bit generator 109 for producing a signal to check a parity between both forms of code. Data are read out of the parallel-serial register 110 in succession upon receipt of clock pulses. An NAK signal read out of the register 110 is modulated by a modulator 111 and then supplied to the transmitting side.

If, in this case, the transmitting side does not send forth an error-free block signal in a prescribed length of time, the receiving side again issues the same NAK signal to the transmitting side. When the error-detecting circuit 91 detects an error concerning a block signal, the error-detecting flip-flop circuit 100 is set as shown in FIG. 7(d) upon receipt of an error detection output through the AND circuit 104. A set output from the error-detecting flip-flop circuit 100 actuates a counter 106 through an AND circuit 105 at a time interval of 100 milliseconds. This counter 106 functions as a timer and sends forth a carry signal at a prescribed time interval. The carry signal provides a timing for an NAK signal to be supplied to the parallel-serial register 110 through the OR circuit 107. Accordingly, the receiving side continues to send forth an NAK signal to the transmitting side, until it again supplies the receiving side with error free data. When the receiving side is again supplied with error-free data, the flip-flop circuit 100 is reset as shown in FIG. 7(d) upon receipt of a clock pulse through an AND circuit 112. Data of a block signal whose error has been detected is read out, as shown in FIG. 7(e), from the memory 92 to the receiving terminal device 25 through the AND circuit 99.

Figure 8:
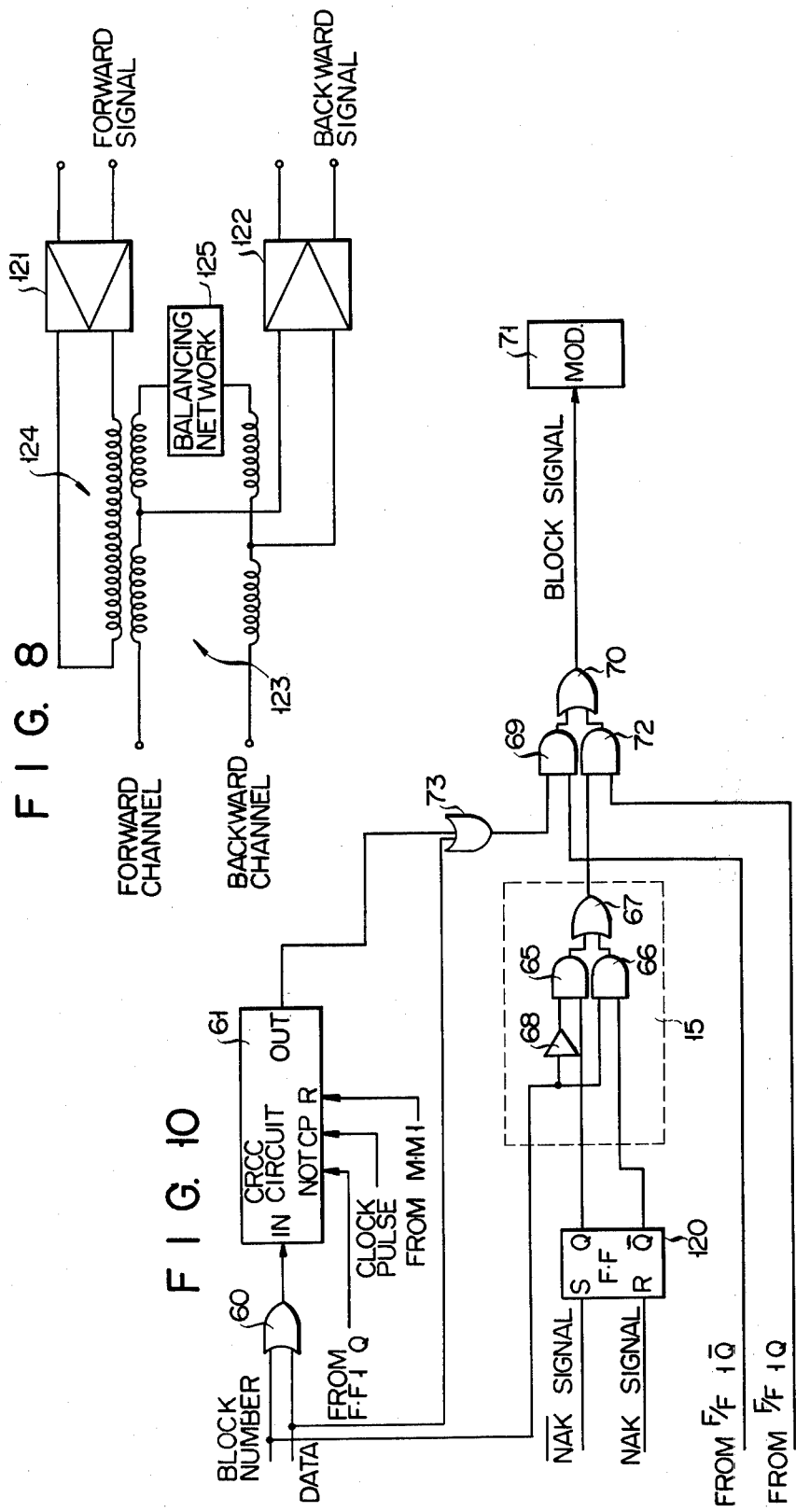
FIG. 8 indicates a concrete form of a separation circuit of FIG. 2.

FIG. 8 shows a concrete form of the separation circuits 17, 21 of the transmitting and receiving sides. This separation circuit separates a forward signal such as a block signal from a backward signal such as an NAK signal. This separation circuit comprises amplifiers 121, 122 for the forward and backward channels respectively and a balancing network 125. A block signal is sent forth from the transmitting side to the receiving side through a forward channel. A NAK signal is issued from the receiving side to the transmitting side through a backward channel.

There will not be described by reference to FIGS. 2, 3 and 9 error-free data transmission between the transmitting and receiving sides which constitutes the principal feature of this invention. It will be noted that the block signal and NAK signal have the same arrangement as previously described. Now let it be assumed that the transmitting section Tt of the transmitting side supplied 8 block signals to the receiving side, as shown in FIG. 9(a), through a transmission channel, and that the receiving side receives the 8 block signals in an error-free state, as shown in FIG. 9(b). The receiving side always examines whether data sent forth from the transmitting side are free from error. When no error is detected concerning the data supplied from the transmitting side, the error-controlling system of this invention causes the receiving side to make no response to the transmitting side, instead of supplying the transmitting side with an acknowledgment (ACK) signal. It sometimes happens that a noise arising in a backward channel causes a proper NAK signal to be a dummy NAK signal $\overline{NAK}$, or an NAK signal issued from the receiving side is turned into such dummy NAK signal $\overline{NAK}$ due to the occurrence of a noise in the backward channel. A dummy $\overline{NAK}$ varied from a proper NAK signal due to a noise occurring in a backward channel is detected by the receiving section of the transmitting side. The dummy $\overline{NAK}$ signal is demodulated by a backward signal demodulator 19 through a separation circuit 17 and further decoded by a backward signal decoding circuit 20. Since the decoded signal is a dummy NAK signal, a control signal is supplied to the switching circuit 13, causing this switching circuit 13 which is normally connected to the error detecting code-attaching circuit 14 (or the CRCC circuit) to be connected to a reversed code attaching circuit 15.

An error detecting code CRC is normally attached to a fractional block signal formed of a block data having a prescribed number of bits which has been read out of the memory circuit 12 and a block number code. After being modulated by a modulator 16, a fully formed block signal is delivered to the receiving side. When the transmitting side receives a dummy $\overline{NAK}$ signal from the receiving side, the transmitting side sends forth the succeeding block signal to the receiving side with the error detecting code CRC of the block signal reversed. This reversed CRC code is provided by the reversed code-attaching circuit 15 which reverses the binary digits "1" and "0" constituting the respective bits of the error-detecting code and attaches a reversed CRC code to a fractional block signal formed of a block data code and block number code. A block signal 6 which does not contain a proper error-detecting code is expressed as $\overline{D6}$ in FIG. 9(a).

The receiving side receives the initially erroneous block signal $\overline{D6}$ as such. Accordingly, the error of the block signal $\overline{D6}$ is naturally detected by the error detecting circuit 24, a detection output from which closes the gate circuit 23, thereby preventing block signals following the block signal $\overline{D6}$ from being conducted to the receiving terminal device 25. The block number code of the block signal $\overline{D6}$ whose error has been detected is delivered to the backward signal modulating circuit 26, which provides a proper NAK signal NAK6 of FIG. 9(c) formed of a block number code, and parity code. The NAK signal is further modulated and sent forth to the transmitting side as shown in FIG. 9(d).

The NAK signal corresponding to the block signal $\overline{D6}$ is demodulated by the backward signal-demodulating circuit 19 of FIG. 2, and further decoded by the backward signal-decoding circuit 20. Since the NAK6 is now free of error, the switching circuit 13 remains connected to the CRCC circuit 61. An output from the backward signal decoding-circuit 20 temporarily prevents data from being issued from the data souce 11, causing block signals to which a retransmission signal RIS has been attached to be again supplied to the receiving side, starting with the data of a block number 6 which is stored in the memory circuit 12.

The receiving side receives retransmitted block signals in succession, as shown in FIG. 9(b). If no error is detected during the retransmission by the error-detecting circuit 24, the gate circuit 23 is opened to allow the retransmitted block signals to be carried to the receiving terminal device 25.

The timer 27 is actuated at a point of time (represented by t2 of FIG. 9) at which the transmitting side initially sent forth an erroneous block signal 6. If the receiving side does not issue an error-free NAK signal to the transmitting side in a prescribed length of time after t2, the transmitting side again delivers a purposely erroneous block signal 6 (characterizing this invention) to the receiving side. This procedure eliminates the suspension of data transmission between the transmitting and receiving sides, even when the NAK6 signal of FIG. 9(c) is rendered erroneous due to the occurrence of a noise in a transmission channel and fails to be detected by the transmitting side.

A block signal 7 following the purposely erroneous block signal 6 may be issued in a proper form or in the form of a simplied dummy code.

When a NAK signal issued from the receiving side is rendered erroneous due to the occurrence of a noise in a transmission channel, the receiving side again sends forth another NAK signal in a prescribed length of time after a point of time t3 at which the first NAK signal was delivered. To give an example, if a block signal 2 issued from the transmitting side is rendered erroneous and a corresponding NAK signal sent forth from the receiving side is turned into a dummy $\overline{NAK}$ signal due to the occurrence of a noise in a transmission channel, the receiving side again delivers a NAK signal corresponding to the block signal 2 in a prescribed length of time T1 (FIG. 9) after a point of time t1 at which the first NAK signal was issued from the receiving side. The point of time t2 at which the transmitting side sends forth the purposely erroneous block signal 6 arises after the transmitting side receives a dummy $\overline{NAK}$ signal. A maximum length of time T2 required for a proper NAK signal corresponding to the purposely erroneous block signal 6 to be received by the transmitting side is substantially the same as the aforesaid length of time T1.

When, therefore, an error is detected concerning a first block signal 2, the receiving side issues, in most cases, a second NAK 2 signal corresponding to block signal 2. When the transmitting side receives a second NAK signal corresponding to the block signal 2, a NAK 6 signal corresponding to the block signal 6 later received is overlooked, causing block signals to be retransmitted, starting with the block signal 2.

The foregoing description relates to the case, where, when the transmitting side receives a dummy NAK signal, a purposely erroneous block signal is formed with a reversed error-detecting code attached to the succeeding block data. For the object of this invention, the purposely erroneous block signal may be formed by reversing a block number code or a block data code.

FIG. 10 shows a fractional circuit for reversing a block number code. The differences between FIGS. 10 and 2 are that in FIG. 10 the flip-flop circuit 78 of FIG. 4 is replaced by a flip-flop circuit which is set by a dummy NAK signal and reset by a NAK signal and that the reverse code attaching circuit 15 is set in a different position from FIG. 2.

Referring to the circuit of FIG. 10, a block number code is reversed by a NAK signal. Therefore, the transmitting side sends forth a block signal including a reversed block number code to the receiving side. Data transmission is carried out in the same manner as in FIG. 2.

FIG. 11 indicates a fractional circuit for reversing a block data code. A block data code is reversed by the reversed code-attaching circuit 15. Therefore, a block signal issued from the OR circuit includes a reversed block data code. The whole block data code need not be reversed. Part of the block data code formed of some bits may be reversed. In the latter case, it is advisable to supply a timing signal for specifying a prescribed bit period to the reversed code-attaching circuit 15.

The error-controlling system of this invention quickly restores data transmission to a normal state, even when a dummy NAK signal arises due to the occurrence of a noise in a backward channel, and moreover is only formed of a simple circuit such as a code-reversing circuit. Further, the error-controlling system of this invention eliminates the use of a control signal, for example, an enquiry signal. Therefore, the transmission state of the communication system is surely and quickly known resulting in high data-transmission efficiency.

What we claim is:

1. An error control system for transmission of data between a transmitter and a receiver,
    the transmitter comprising:
    means for transmitting successively a series of block signals each formed of data, a block number code and an error-detecting code to the receiver through a forward channel;
    means for detecting a negative acknowledgement including a block number designation designating a block signal in which an error is detected at the receiver
    means for detecting a false negative acknowledgement sent forth from the receiver;
    means for inverting all bits of a data signal or an error detecting code being transmitted upon detection of the negative acknowledgement;
    means for transmitting the inverted data signal or the error detecting code to the receiver;
    the receiver comprising:
    means for detecting an error from at least the data signal included in the block signals received and
    means for sending forth through a backward channel the negative acknowledgement upon detection of an error to cause the transmitter to again deliver block signals, the first one of which is a block signal corresponding to the block signal found erroneous.

2. The error control system according to claim 1 wherein the inverting means includes means for inverting a predetermined number of bits of the data.

3. The error control system according to claim 1 wherein the inverting means includes means for inverting a predetermined number of bits of the error-detecting code.

4. The error control system according to claim 3 further comprising a continuous automatic repeat request system in combination therewith.

5. The error control system according to claim 1 wherein the inverting means includes means for inverting a predetermined number of bits of the block number code.

* * * * *

UNITED STATES PATENT AND TRADEMARK OFFICE
CERTIFICATE OF CORRECTION

PATENT NO. : 4,144,522
DATED : March 13, 1979
INVENTOR(S) : Kageyama et al

It is certified that error appears in the above—identified patent and that said Letters Patent are hereby corrected as shown below:

The title of the invention is printed erroneously as "Electro-Control System For Data Transmission". The correct title should be "Error-Control System For Data Transmission".

Signed and Sealed this

Thirty-first Day of July 1979

[SEAL]

Attest:

Attesting Officer

LUTRELLE F. PARKER
Acting Commissioner of Patents and Trademarks